Oct. 3, 1939.  C. S. ASH  2,174,611
BRAKE DRUM
Filed Sept. 23, 1935
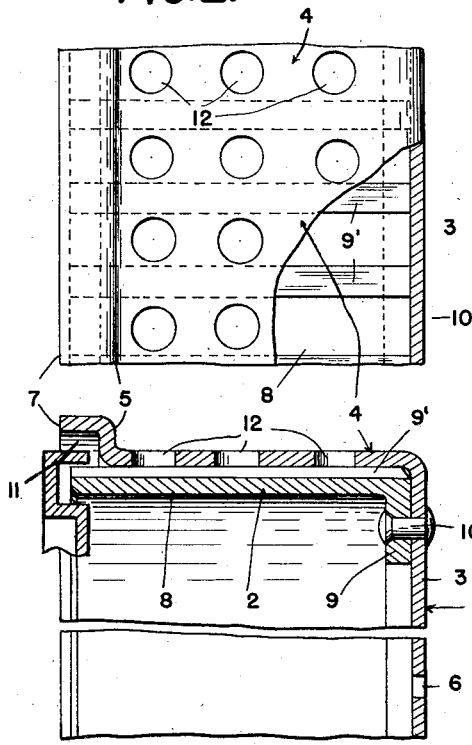
FIG.2.
FIG.1.
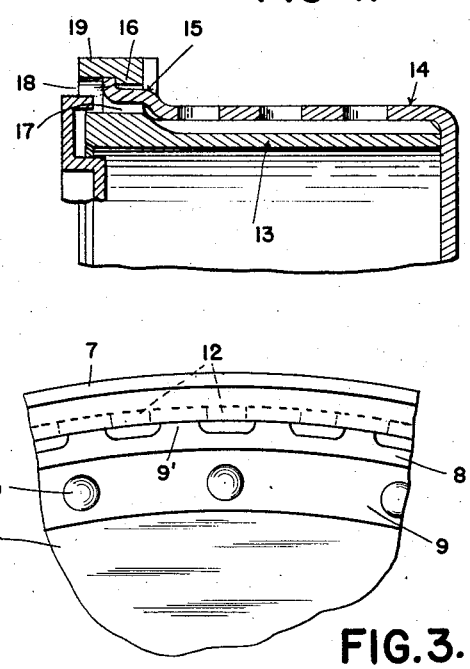
FIG.4.
FIG.3.
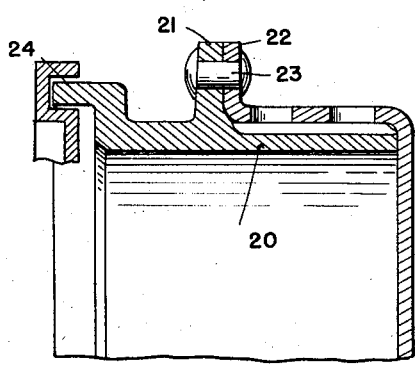
FIG.5.
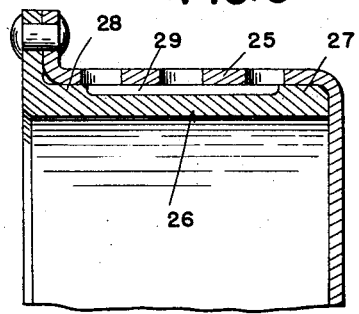
FIG.6.
INVENTOR
CHARLES S. ASH
BY
ATTORNEYS Patented Oct. 3, 1939

2,174,611

UNITED STATES PATENT OFFICE 2,174,611

BRAKE DRUM

Charles S. Ash, Milford, Mich., assignor to Kelsey-Hayes Wheel Company, Detroit, Mich., a corporation of Delaware Application September 23, 1935, Serial No. 41,820

3 Claims. (Cl. 188—218)

The invention relates to brake drums and has for one of its objects to provide an improved brake drum having a satisfactorily wearing surface and constructed to have the desired strength and lightness in weight. The invention has for another object to provide a brake drum allowing for maxmum width of braking surface and minimum depth of brake drum shell. The invention has for further objects to provide a brake drum having its parts so constructed that they can be economically manufactured; to provide a brake drum having its parts so constructed that they can be readily and economically assembled; and to provide a brake drum having provision for cooling the braking surface.

These and other objects of the invention will become apparent from the following description, taken in connection with the accompanying drawing, in which Figure 1 is a cross section through a brake drum showing an embodiment of my invention;

Figure 2 is a plan view of a portion thereof;

Figure 3 is an elevation thereof;

Figures 4, 5 and 6 are views similar to Figure 1 showing other embodiments of my invention.

Referring to Figures 1, 2 and 3, the brake drum comprises the shell 1 and the brake engaging element 2. The shell comprises the back 3, the annular flange 4 integral with the back and the generally radially outwardly extending annular reinforcing rib 5 integral with and extending from the free end of the annular flange. The back 3 is provided with the annular series of holes 6 providing for the passage of the means for securing the back of the wheel hub. The reinforcing rib 5 is provided with the peripheral axially extending portion 7. The shell is of relatively light weight, it being a stamping preferably formed of soft material of relatively light gauge, the gauge, however, being sufficient to enable the shell to withstand the stresses to which it is subjected during the operation of the brake drum. By forming the shell of a stamping, the annular flange and the reinforcing rib are thinner than the back, thereby reducing the weight of the shell. Furthermore, by reason of the shell being a stamping, the shell is true and balanced without requiring extra machining operations.

The brake engaging element 2 is a liner formed separately from the shell and of a material providing a satisfactorily wearing braking surface. In the present instance, this liner is formed of cast iron. The liner has the annular portion 8 which extends within the annular flange 4 and also extends axially beyond this annular flange to provide an internal braking surface having an axial extent greater than that of the annular flange. The liner is also formed with the radial portion 9 which is adapted to be secured against the back 3 by suitable means, such as the rivets
10. The axial extension of the annular portion 8 cooperates with the reinforcing rib 5 to form the axially opening groove 11 for receiving an annular flange upon a backing or brake supporting plate, thereby forming a labyrinth seal between the brake drum and the backing or brake supporting plate.

To facilitate cooling, the annular flange 4 is provided with the annular series of holes 12 therethrough and the annular portion 8 of the liner is formed with the external axially extending ribs 9' which are angularly spaced to engage the annular flange 4 between adjacent peripherally spaced holes and throughout substantially the entire axial extent of the annular flange. The external diameter of the liner is preferably such that the liner has a tight fit with the annular flange.

In the modification shown in Figure 4, the general construction is the same as that shown in Figures 1, 2 and 3, with the exception that the brake engaging element or liner 13 is secured to the brake shell 14 by being interlocked with the reinforcing rib 15 at the free end of the annular flange. More in detail, the brake engaging element or liner has intermediate the ends of its annular portion the radially outwardly extending annular portion 16 which is provided with the angularly spaced openings 17. The reinforcing rib is provided with the angularly spaced fingers 18 which extend through these openings and are crimped over against the portion 16, whereby the shell and the liner are mechanically interlocked. It will be noted that the annular portion 16 has the peripheral axially extending part 19 which cooperates with the axial extension of the liner to form an axially opening annular groove for use in forming a labyrinth seal with the backing or brake supporting plate.

Figure 5 shows another construction of brake drum in which the brake engaging element or liner 20 is formed intermediate its ends with the annular radially outwardly extending rib or flange 21, which is directly secured against the reinforcing rib 22 of the shell by suitable means, such as the rivets 23. In this construction the free end of the liner is formed with the radially offset annular portion 24 within which may extend an annular flange upon the backing or brake supporting plate.

Figure 6 discloses another modification of brake drum which is similar to that shown in Figure 5, but differs in that the annular flange 25 of the shell is of greater axial extent than the annular flange of the brake drum shell, shown in Figure 5. Another difference is that of forming the brake engaging element or liner 26 with endless lands 27 and 28 at opposite ends or at the ends of the external ribs 29 for continuous engagement with the end portions of the annular flange 25.

What I claim as my invention is:

1. A brake drum, comprising a one-piece sheet metal shell having a back and annular flange and a reinforcing rib at the free end of said annular flange, and a separately formed brake engaging element secured to said shell and having a brake engaging portion extending into said annular flange with portions spaced radially from the latter, said brake engaging portion also extending axially beyond said annular flange and cooperating with said reinforcing rib to form an axially opening channel.

2. A brake drum, comprising a one-piece stamped sheet metal shell having an annular flange, a back at one end of said annular flange, a reinforcing rib at the other end of said annular flange, a separately formed brake engaging element within said annular flange provided with a generally radially outwardly extending part having angularly spaced openings, and fingers projecting from the reinforcing rib through said openings and having an interlocking engagement with said radially outwardly extending part.

3. A brake drum, comprising a sheet metal shell having an annular flange and having a back at one end of the annular flange, a reinforcing rib at the other end of the annular flange, a cast brake engaging element within the annular flange provided with a generally radially outwardly extending portion having angularly spaced openings therethrough, and fingers projecting from the reinforcing rib through said openings and having an interlocking engagement with said part.

CHARLES S. ASH.